(12) United States Patent
Perry

(10) Patent No.: US 7,681,530 B2
(45) Date of Patent: Mar. 23, 2010

(54) ZERO EDGE AQUARIUM

(75) Inventor: Brett Perry, Elgin, IL (US)

(73) Assignee: ZeroEdge Aquarium Corp., Bloomingdale, IL (US)

( * ) Notice: Subject to any disclaimer, the term of this patent is extended or adjusted under 35 U.S.C. 154(b) by 407 days.

(21) Appl. No.: 11/592,382

(22) Filed: Nov. 3, 2006

(65) Prior Publication Data
US 2008/0105210 A1    May 8, 2008

(51) Int. Cl.
  *A01K 63/00*    (2006.01)
(52) U.S. Cl. .................................. 119/269; 119/255
(58) Field of Classification Search .............. 119/269, 119/255, 245, 249, 253; D30/101; D23/201
See application file for complete search history.

(56) References Cited

U.S. PATENT DOCUMENTS

| 475,082 | A | * | 5/1892 | Gunther | 119/264 |
|---|---|---|---|---|---|
| 2,877,051 | A | * | 3/1959 | Cushman et al. | 239/17 |
| D221,650 | S | * | 8/1971 | Gruber | D23/201 |
| 4,217,315 | A | * | 8/1980 | Keeler, II | 261/120 |
| 4,836,142 | A | * | 6/1989 | Duback | 119/255 |
| D348,418 | S | * | 7/1994 | White-Wexler et al. | D11/155 |
| D351,488 | S | * | 10/1994 | Tominaga | D30/101 |
| D394,301 | S | * | 5/1998 | Fisher | D23/201 |
| 5,799,609 | A | * | 9/1998 | Burns et al. | 119/74 |
| D430,642 | S | * | 9/2000 | Fisher | D23/201 |
| D449,717 | S | * | 10/2001 | Fang | D30/101 |
| D449,904 | S | * | 10/2001 | Fang | D30/101 |
| D450,783 | S | * | 11/2001 | Nagasawa | D21/483 |
| 6,450,122 | B1 | * | 9/2002 | Frank | 119/259 |
| 6,499,249 | B1 | * | 12/2002 | Luijkx | 47/41.01 |
| 6,527,257 | B1 | * | 3/2003 | Schuld | 261/29 |
| 6,666,168 | B2 | * | 12/2003 | Stutz et al. | 119/259 |
| 6,848,395 | B2 | * | 2/2005 | Deming, Jr. | 119/250 |
| 6,932,026 | B2 | * | 8/2005 | Lin | 119/225 |
| 2007/0012256 | A1 | * | 1/2007 | Pieretto et al. | 119/248 |

* cited by examiner

*Primary Examiner*—Yvonne R. Abbott
(74) *Attorney, Agent, or Firm*—Pauley Petersen & Erickson

(57) ABSTRACT

The invention is a zero edge or infinity aquarium for viewing aquatic life. The design offers unobstructed viewing through a smooth lens of water on the sides and the top. The aquarium is constructed of a transparent material and water is circulated over the top of and along the outside of the sidewall before being collected in a gutter and drain box. The top edge and corners of the aquarium are rounded to aid in the flow of water. The water is then returned to the interior of the aquarium via an infeed. The infeed may comprise a sump, pump, piping, valving, and a return outlet. It offers a unique view of the contents as there appears to be no lid, edge, or structure within the water.

25 Claims, 6 Drawing Sheets

ZERO EDGE AQUARIUM

BACKGROUND OF THE INVENTION

1. Field of the Invention

This invention relates to a zero edge aquarium or an infinity aquarium which is an aquarium without visible structures.

2. Description of Related Art

Aquariums often have rims, supports, covers or edges that obstruct the view of the contents. Additionally the surface of the water of most aquariums is disturbed by the flow of bubbles or other discharges. The turbulence obstructs the view of the contents and can create noises that detract while viewing contents of the aquarium.

SUMMARY OF THE INVENTION

An aquarium according to this invention is useful for containing and viewing aquatic life. A preferred embodiment of this invention offers unobstructed viewing through a smooth lens of water on the sides and the top. This is often referred to as a zero edge aquarium or an infinity aquarium. The aquarium is constructed of at least partially from a transparent material and water is circulated over the top of and along the outside of the sidewall before being collected in a gutter and a drain box and optionally a drain channel. The top edge and corners of the aquarium are rounded to aid in the flow of water. The water is then returned to the interior of the aquarium via an infeed. The infeed may comprise a sump, pump, piping, valving, and a return outlet. The aquarium can be virtually any shape or size. It offers a unique view of the contents as there appears to be no lid, edge, or structure within the water. Additional prefiteration or filtration is employed per the needs of the aquarium. Another preferred embodiment provides a smooth fluid surface and smooth flow over the sides to offer clean and quiet viewing of the contents. This is done by the design of the aquarium tank and the flow components.

BRIEF DESCRIPTION OF THE DRAWINGS

The above-mentioned and other features of this invention will be better understood from the following detailed description taken in conjunction with the drawings wherein.

DESCRIPTION OF PREFERRED EMBODIMENTS

Figure 1:
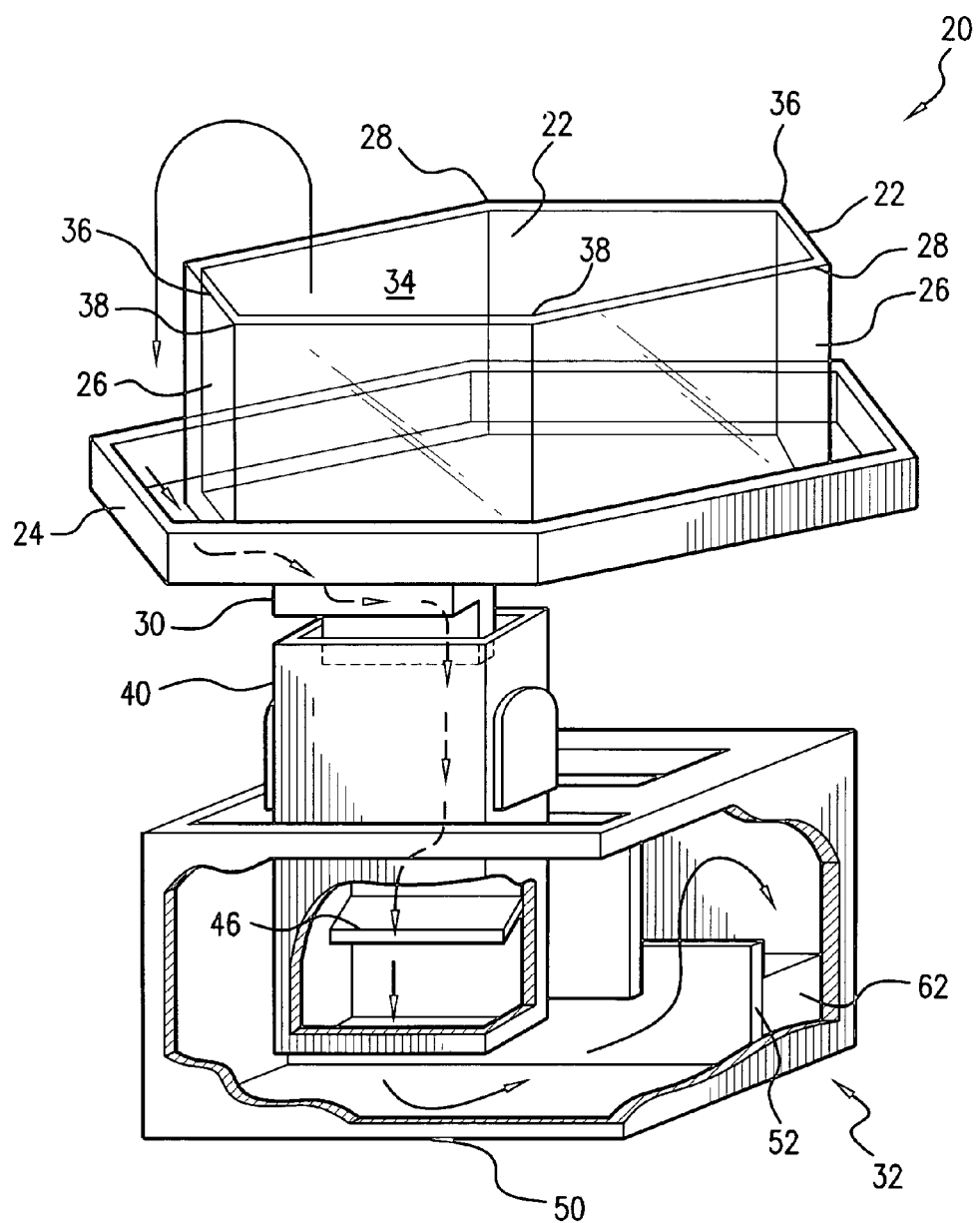
FIG. 1 is a partial exploded view of an aquarium according to a preferred embodiment of the invention.

FIG. 1 shows a partial exploded view of aquarium 20. Both fresh and saltwater aquariums 20 typically have sidewalls 22 where fluid 62, typically water, occupies at least a part of interior volume 34. Fluid 62 may have a saline nature from the addition of salts or minerals or variations in pH according to the practices of keeping aquatic life. Aquatic life is diverse ranging from, but not limited to, plankton, algae, corals, crustaceans, muscles, fish, sharks, reptiles, amphibians, and mammals.

Aquarium 20 is made of any suitable at least partially transparent or substantially transparent material adapted for viewing. These are such as, but not limited to, glass, acrylics, polycarbonates, etc. According to at least one preferred embodiment of the invention, materials of construction have a refractive index that approximates that of fluid 62. Sidewall 22 can be a variety of thickness depending on the shape, size, height of aquarium 20. According to one embodiment of the invention, sidewall 22 has a thickness of about ⅛" to 2" or more. In at least one embodiment of the invention sidewall 22 is ½" thick acrylic. In another embodiment of the invention the sidewall 22 is 5 mm glass.

One or more sidewalls 22 preferably form interior volume 34 along with bottom. Interior volume 34 is adaptable to aquarium 20 needs and ranges from a fraction of a gallon to thousands of gallons.

According to at least one of the preferred embodiments of the invention, aquarium 20 does not have a top, lid, roof, or cover. This allows unobstructed viewing of contents of aquarium 20.

Other embodiments of the invention may include a partial or total cover with or without the addition of lighting.

According to other preferred embodiments of the invention, sidewalls 22 are constructed without supports or structures that block views of aquarium 20 contents. Sidewalls 22 are capable of taking on any of a number of shapes as viewed from top perimeter 36. Such shapes include, but are not limited, to circle, triangle, square, rectangle, trapezoid, pentagon, hexagon, octagon, decagon, regular polygon, irregular polygons, combinations of arcs/curves of equal or varying diameters, or combinations of curves/arc and straight segments/lengths.

According to one embodiment of the invention, at least a part of sidewall 22 is not transparent. This is beneficial when placing aquarium 20 against another surface such as a wall.

According to at least one preferred embodiment of the invention, sidewalls 22 are substantially vertical. According to other embodiments of the invention, sidewalls 22 are inwardly and/or outwardly angled. Angles of the sidewalls 22 may be adjusted depending upon the properties of fluid 62 such as viscosity, surface tension, and affinity for materials of sidewall 22.

Figure 2:
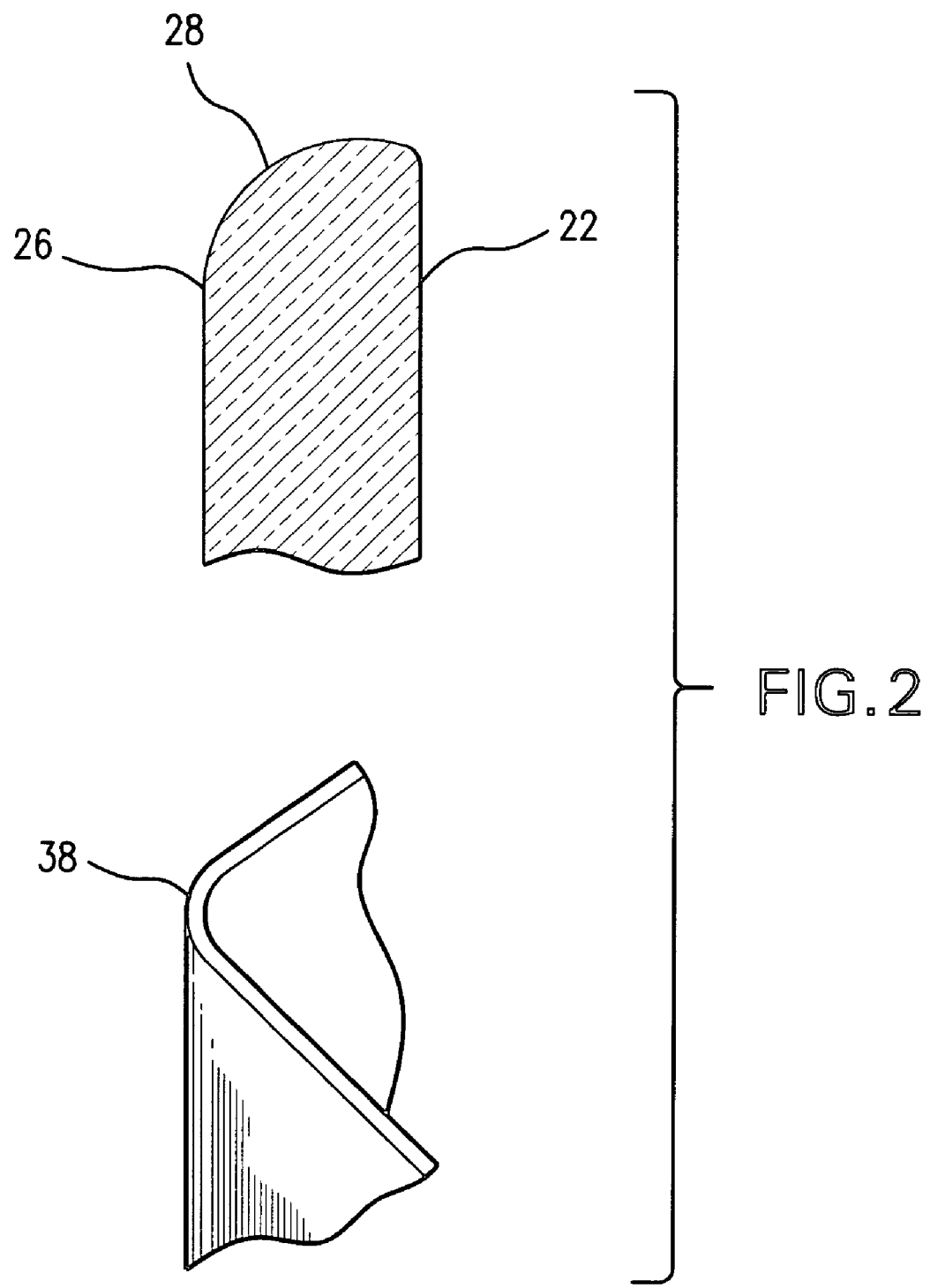
FIG. 2 shows a detail view of a radiused upper edge of a sidewall according to a preferred embodiment of the invention.

As shown FIG. 2, according to a preferred embodiment of the invention, at least a part of sidewall 22 has radiused upper edge 28 which allows fluid 62 to flow over radiused upper edge 28 without creating significant ripples or turbulence in fluid surface 70 or on outer surface 26 of sidewall 22. Radiused upper edge 28 creates a smooth lens of fluid 62 on fluid surface 70 and sidewall 22. Smooth lens creates a zero edge aquarium or an infinity aquarium.

Curvature of radiused upper edge 28, or bullnose edge, maybe may be varied depending on viscosity of fluid 62.

As shown in FIG. 2, in at least one of the embodiment of the invention, some of corners 38 formed by the union of sections of sidewalls 22 are rounded to minimize ripples or turbulence of fluid 62. Corners 38 allow for containment of fluid 62 to avoid escaping or leakage and enhance viewing of contents of the aquarium 20 since there is a smooth lens of fluid on top and sides. An additional benefit is that noise of fluid 62 splashing or gurgling is minimal. Attention is given while producing corner 38 or seam to minimize visual impact. According to at least one embodiment of this invention, square or right angle corners 38 have one or both of the two adjoining pieces of material rounded off and then bull nosing outer corner 38 where two radiused upper edges 28 meet.

Fluid 62 preferably flows along at least a portion of outer surface 26 of sidewall 22. According to one embodiment of the invention, entire top perimeter 36 of aquarium 20 includes fluid 62 flowing over radiused upper edge 28.

Figure 6:
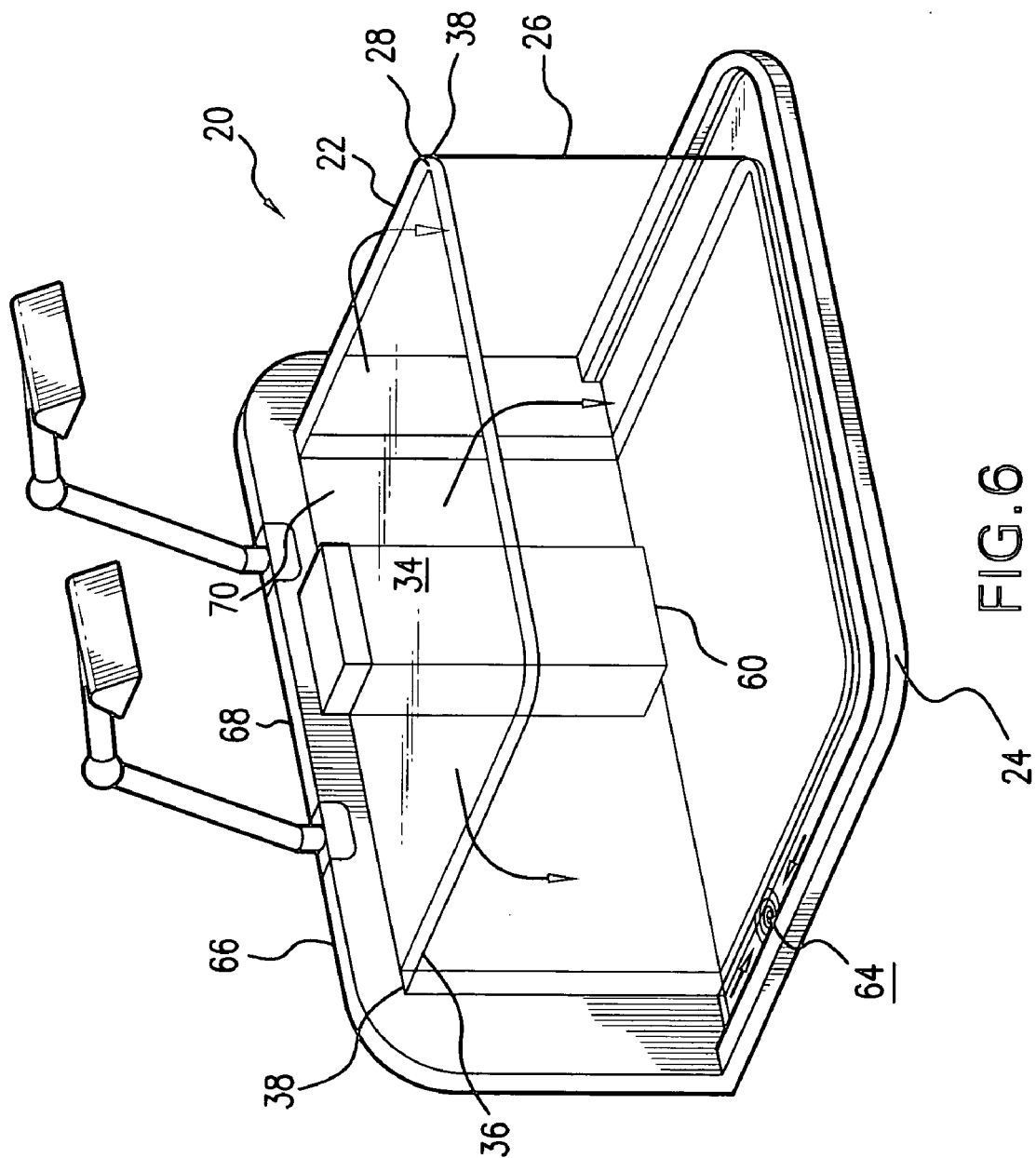
FIG. 6 is a perspective view an aquarium according to a preferred embodiment of the invention.

As shown in FIG. 6, according to other embodiments of this invention, at least one backwall 66 replaces a sidewall 22 with varying height so that fluid 62 does not flow over on all sides. According to this embodiment of the invention, top edge 68 of backwall 66 is preferably above fluid surface 70. The open top and overflowing sidewalls 22 create a large surface area which allows oxygen to become dissolved in fluid 62.

According to a preferred embodiment of the invention, outer surface 26 of sidewall 22 is smooth so as to maintain virtually ripple-free flow of fluid 62. Alternatively, sidewall 22 of aquarium 20 may include texture/uneven surfaces or even protuberances to produce a more rippled flow.

According to a preferred embodiment of this invention, gutter 24 is positioned along bottom perimeter of sidewall 22. Fluid 62 flows over radiused upper edge 28 and along sidewall 22 to gutter 24. Gutter 24 is in fluid communication with sidewall 22. This allows gutter 24 to collect fluid 62 from outer surface 26 of sidewall 22. In at least one preferred embodiment of this invention, gutter 24 extends entire length of lower perimeter of sidewall 22. Other embodiments of this invention, may include gutter 24 along only a portion of lower perimeter of sidewall 22.

According to one embodiment of this invention, gutter 24 is positioned above or below bottom of sidewall 22 of aquarium 20. Gutter 24 is a suitable size to contain the volume of fluid 62 flowing down sidewall 22 as it flows to drain box 30.

Gutter 24 is made of materials relatively impervious to fluid 62 such as: glass, metal, plastic, wood, etc. Gutter 24 may be of various shapes including, but not limited to, square or U-shaped troughs/conduit. According to an embodiment of the invention, gutter 24 is integral to aquarium 20. According to other embodiments of the invention, gutter is detachable relative to sidewalls 22.

According to one embodiment of this invention, filler material such as gravel is positioned in gutter 24 and allows fluid 62 to flow on, through, or below filler material.

According to a preferred embodiment of the invention, fluid 62 in gutter 24 flows to at least one drain box 30. Drain box 30 is preferably integral to aquarium 20. Still other embodiments of this invention may include drain box 30 affixed with suitable fasteners such as adhesive or screws.

Drain box 30 may be made of materials relatively impervious to fluid 62 such as: glass, metal, plastic, wood, etc. In at least one embodiment of the invention, fluid 62 flows in drain box 30 in a step-like fashion and drain box 30 directs fluid 62 away from outer perimeter of aquarium 20.

Other embodiments of this invention may include fluid 62 flowing into gooseneck within drain box 30.

Figure 5:
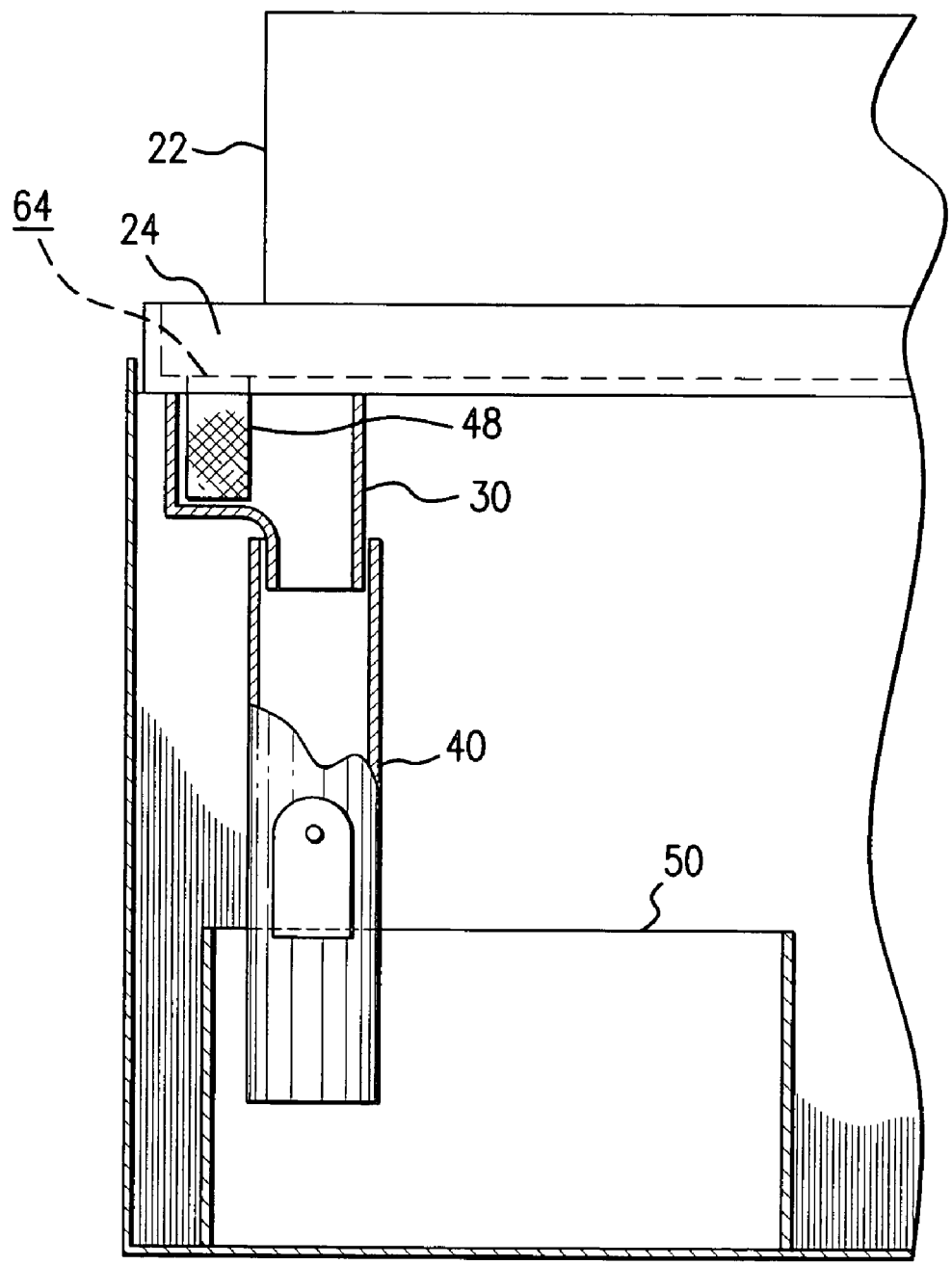
FIG. 5 shows a partial side view of a drain channel and a prefilter according to a preferred embodiment of the invention.

As shown in FIG. 5, according to a preferred embodiment of the invention, prefilter 48 is installed in the drain box 30. Prefilter 48 removes particles from fluid 62 and minimizes splashing or gurgling of fluid 62 in drain box 30. According to a preferred embodiment of this invention, prefilter 48 is installed adjacent or touching drain aperture 70 or a hole in the gutter. This additionally minimizes splashing or gurgling of fluid 62. Suitable material for prefilter 48 include, but are not limited to, sponge (natural or man-made), foam, sand, activated carbon, etc. According to a preferred embodiment of this invention, fluid 62 from drain box 30 flows to infeed 32 for return to aquarium 20.

Figure 4:
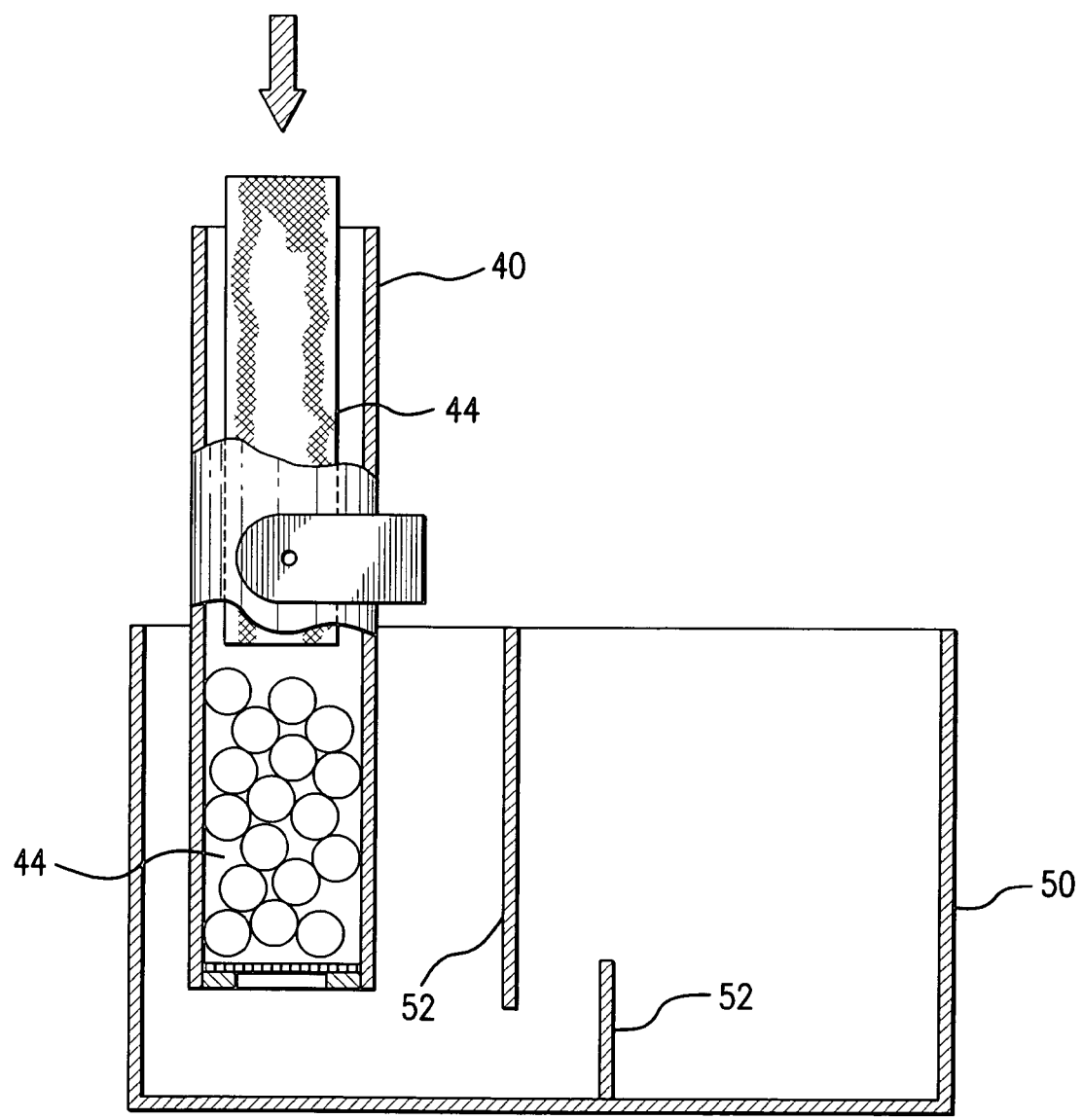
FIG. 4 shows a partial side view of a drain channel and a sump according to a preferred embodiment of the invention.

As shown in FIG. 4, according to a preferred embodiment of this invention, fluid 62 flows from drain box 30 through drain channel 40 before infeed 32. Drain channel 40 may be made of materials that are relatively impervious to fluid 62 such as: glass, metal, plastic, wood, etc.

According to a preferred embodiment, drain channel 40 has legs on a side which are positionable between engaged and disengaged position that facilitates maintenance of aquarium 20 or infeed 32.

As shown in FIG. 4, according to one preferred embodiment of this invention, filter media 44 is positioned in drain channel 40. Suitable material of filter media 44 include, but are not limited to, sponge (natural or man-made), foam, sand, activated carbon, etc. Selection of filter media 44 is made by one skilled in keeping of aquariums 20.

According to one embodiment of the invention, filter media 44 is placed on lattice structure or egg crate for support. An additional benefit of filter media 44 is reduced splashing and gurgling of fluid 62.

According to one embodiment of the invention, baffle 46 is positioned in drain channel 40 to direct flow and minimize splashing and gurgling of fluid 62. An additional benefit of baffle 46 is minimizing evaporation of fluid 62. According to one embodiment of the invention, baffle 46 is horizontal. According to additional embodiments of this invention, baffle 46 is sloped. Baffle 46 is made of same or similar materials to drain channel 40.

Figure 3:
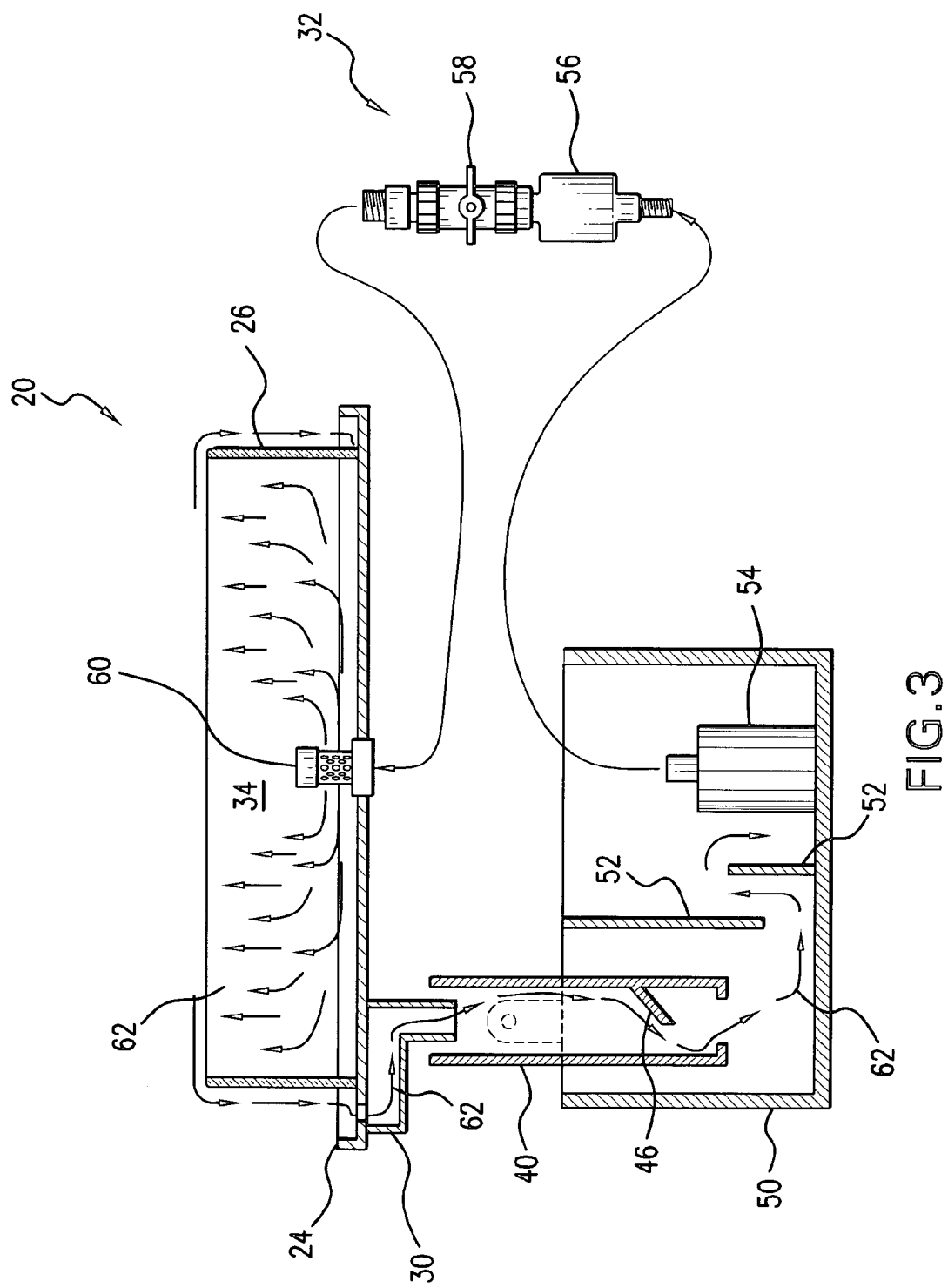
FIG. 3 shows a partial side view of an aquarium according to a preferred embodiment of the invention.

As shown in FIG. 3, according to one embodiment of the invention, fluid 62 then reaches infeed 32 which returns fluid 62 to aquarium 20. According to one embodiment of the invention, infeed 32 includes sump 50. Sump 50 collects fluid 62 before returning to aquarium 20.

In at least one embodiment of the invention, sump 50 includes weir element 52 to separate sump 50 into two or more sections. Weir element 52 is an arrangement of flow modifiers including, but not limited, to baffles, weirs, and dams. Weir element 52 is useful for providing calm fluid 62 to inlet of a circulating force.

According to one embodiment of the invention, a circulating force is pump 54. Pump 54 is in fluid communication with sump 50 and may be internal or external to sump 50. Pump 54 provides motive force to fluid 62. Typical motive force means include, but are not limited to, centrifugal pumps, rotary pumps, submersible pumps, positive displacement pumps, diaphragm pumps, peristaltic pumps, and ejectors/eductors. According to a preferred embodiment of this invention, pump 54 is a mag 12.

According to a preferred embodiment of the invention, pump 54 has a discharge pressure and flowrate sufficient to return fluid 62 to aquarium 20 including head and line losses while creating desired flows over radiused upper edge 28.

As shown in FIG. 3, according to one embodiment of this invention, infeed 32 further comprises check valve 56 or other back flow preventing device. Check valve 56 reduces loss of fluid 62 if pump 54 is not in operation. According to other embodiments of this invention, infeed 32 includes isolation valve 58. Isolation valve 58 is located after fluid 62 flows through check valve 56. Isolation valve 58 allows for maintenance on check valve 56. A type of isolation valve 58 maybe, but is not limited to, gate, globe, plug, ball, butterfly, or pinch. According to one preferred embodiment of the invention, fluid 62 flows from pump 54 through check valve 56 and then through isolation valve 58 before returning to aquarium 20.

Return outlet 60 is located at aquarium 20 and provides a means for returning fluid 62 to aquarium 20. According to one embodiment of the invention, return outlet 60 may be a simple bulkhead fitting or hose.

According to other embodiments of this invention, return outlet 60 has diffusing characteristics that minimize rippling of fluid surface 70.

According to one preferred embodiment of this invention, return outlet 60 comprises orifices as shown in FIG. 3. According to other embodiments of the invention, return outlet 60 includes the use of cover plates, baffles, goosenecks, and/or porous media such as pebbles/rocks. According to other embodiments of the invention a combination of nozzles, flow modifiers and/or media comprise return outlet 60.

According to a preferred embodiment of the invention, return outlet 60 is substantially centrally positioned on bottom of aquarium 20. According to an embodiment of this invention, return outlet 60 is positionable anywhere in fluid communication with interior volume 34. According to an embodiment of this invention, return outlet 60 may also be positioned on sidewalls 22 as shown in FIG. 6.

According to other embodiments of the invention, return outlet 60 creates turbulence and/or bubbles with nozzles for a fountain-like or agitation effect.

In fluid communication is defined as liquid flowing between two components with little loss of liquid. Some common means of providing fluid communication include but are not limited to pipe, tube, hose, fittings, and valves with joints that are welded, threaded, glued, interference fit, coupled, or other mechanically fastened means. Materials of construction of fluid communication means are compatible with fluid 62 and include, but not limited to, plastics (PVC, CPVC, ABS, HDPE, rubber, neoprene, etc.) and metals (iron, steel, stainless steel, brass, copper, alloys, etc.). Often physically placing two objects next to each other can be sufficient to result in fluid communication.

According to an embodiment of the invention, aquarium 20 maybe positioned on suitable stand that conceals drain box 30 and infeed 32. Stand is constructed of wood, metal, plastic or other material capable of bearing the mass of filled aquarium 20 at a convenient height. According to one embodiment of the invention, stand uses hingeless doors to conceal the internals. According to one embodiment of this invention, stand includes ability to level aquarium 20 with respect to floor. Additional embodiments of this invention include light fixture mounted from stand and/or aquarium 20.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. An aquarium comprising:
    at least one sidewall, wherein the at least one sidewall is at least partially transparent and includes a radiused upper edge;
    a gutter in fluid communication with an outer surface of the at least one sidewall;
    at least one drain box in fluid communication with the gutter; and
    an infeed in fluid communication between the drain box and an interior volume defined by the at least one sidewall, the infeed providing circulation of a fluid from the drain box to the interior volume, the infeed comprising a sump in fluid communication between the drain box and the interior volume and the infeed comprising a pump in fluid communication between the sump and the interior volume, wherein the sump includes a weir element in fluid communication with the drain box and the pump.

2. The aquarium of claim 1, wherein a top perimeter formed by the at least one sidewall is a shape, wherein the shape comprises one of a circle, triangle, hexagon, octagon, regular polygon, irregular polygon, a combination of curves, and a combination of curves and straight lengths.

3. The aquarium of claim 2, wherein at least one corner of the shape is rounded.

4. The aquarium of claim 1, further comprising a drain channel in fluid communication between the drain box and the infeed, positionable between an engaged position and disengaged position.

5. The aquarium of claim 4, further comprising a filter media in the drain channel.

6. The aquarium of claim 4, further comprising a baffle in the drain channel.

7. The aquarium of claim 1, further comprising a prefilter in the drain box.

8. The aquarium of claim 7, further comprising a drain aperture positioned within the gutter, the prefilter positioned in the drain box directly adjacent the drain aperture.

9. The aquarium of claim 1, wherein the infeed further comprises a check valve in fluid communication between the pump and the interior volume.

10. The aquarium of claim 9, wherein the infeed further comprises an isolation valve in fluid communication between the check valve and the interior volume.

11. The aquarium of claim 10, wherein the infeed further comprises a return outlet in fluid communication after the isolation valve and at the interior volume.

12. The aquarium of claim 1, wherein a fluid at least partially fills the interior volume and is at least periodically in circulation over the radiused upper edge of the at least one sidewall, along the outer surface of the at least one sidewall, into the gutter, into the drain box, through the infeed, and returns to the interior volume.

13. The aquarium claim 12, further comprising:
    a drain channel in fluid communication between the drain box and the infeed and positionable between an engaged position and disengaged position; and
    the fluid in circulation through the drain channel.

14. The aquarium of claim 13, further comprising a filter media in the drain channel, the fluid in circulation over and through the filter media.

15. The aquarium of claim 14, further comprising a baffle in the drain channel, the fluid in circulation over the baffle.

16. The aquarium claim 12, wherein the infeed further comprises a sump in fluid communication between the drain box and the interior volume and the fluid is in circulation through the sump.

17. The aquarium of claim 1, further comprising a prefilter in the drain box and the fluid flowing over and through the prefilter.

18. An aquarium comprising:
    at least one sidewall, wherein the at least one sidewall is at least partially transparent and includes a radiused upper edge and a rounded corner;
    a gutter in fluid communication with an outer surface of the at least one sidewall;
    at least one drain box in fluid communication with the gutter;
    a drain channel in fluid communication with the at least one drain box;

a sump in fluid communication between the drain channel and a interior volume defined by the at least one sidewall; and a fluid at least partially filling the interior volume and is at least periodically in circulation over the radiused upper edge of the at least one sidewall, along the outer surface of the at least one sidewall, into the gutter, into the drain box, and into the drain channel, into the sump, and returns to the interior volume.

19. The aquarium of claim 18, further comprising an infeed in fluid communication between the drain channel and an interior volume, the infeed providing circulation of the fluid from the drain box to the interior volume, the fluid in circulation through the infeed.

20. The aquarium claim 19, wherein the sump further comprises a weir element in fluid communication between the drain channel and the interior volume, the fluid is in circulation under and over the weir element.

21. The aquarium claim 20, wherein the infeed further comprises a pump in fluid communication between the sump and the interior volume and the fluid is in circulation by the pump.

22. The aquarium claim 21, wherein the infeed further comprises a check valve in fluid communication between the pump and the interior volume and the fluid is in circulation through the check valve.

23. The aquarium claim 22, wherein the infeed further comprises an isolation valve in fluid communication between the check valve and the interior volume and the fluid is in circulation through the isolation valve.

24. The aquarium claim 23, wherein the infeed further comprises a return outlet in fluid communication after the isolation valve and at the interior volume and the fluid is in circulation through the return outlet.

25. An aquarium comprising:
at least one sidewall, wherein the at least one sidewall is at least partially transparent and includes a radiused upper edge and one or more rounded corners;

at least one backwall, wherein a top edge of the at least one backwall is above a fluid surface in the aquarium;

a gutter in fluid communication with an outer surface of the at least one sidewall;

at least one drain box in fluid communication with the gutter; and an infeed in fluid communication between the drain box and an interior volume defined by the at least one sidewall, the infeed providing a flow of a fluid from the drain box to the interior volume so that the fluid at least partially fills the interior volume and is at least periodically in circulation over the radiused upper edge of the at least one sidewall, along an outer surface of the at least one sidewall, into the gutter, into the drain box and returns to the interior volume.

* * * * *